United States Patent [19]

Kleinknecht et al.

[11] 4,330,213

[45] May 18, 1982

[54] OPTICAL LINE WIDTH MEASURING APPARATUS AND METHOD

[75] Inventors: Hans P. Kleinknecht, Bergdietikon; Heinrich Meier, Urdorf, both of Switzerland

[73] Assignee: RCA Corporation, New York, N.Y.

[21] Appl. No.: 121,529

[22] Filed: Feb. 14, 1980

[51] Int. Cl.$^3$ .......................... G01B 9/02; G01B 11/02
[52] U.S. Cl. ....................................... 356/355; 74/104; 356/384
[58] Field of Search .................................. 356/354–358, 356/384, 387, 351, 305, 321–322, 329, 334; 250/550, 560; 369/109–110; 350/162 R; 74/104–105, 471 R

[56] References Cited

U.S. PATENT DOCUMENTS

| | | | |
|---|---|---|---|
| 3,312,824 | 4/1967 | Cook | 356/329 |
| 4,200,396 | 4/1980 | Kleinknecht et al. | 356/354 |
| 4,236,823 | 12/1980 | Roach et al. | 356/355 |

OTHER PUBLICATIONS

Steele, Jr. et al., "Parallel Incidence for Diffraction Grating Strain Gages", Instruments & Control Systems, 12-1971, pp. 64–66.

Kasdan et al., "Linewidth Measurements by Diffraction Pattern Analysis", SPIE vol. 80, Developments in Semiconductor Microlithography, 1976, pp. 54–63.

Rottmann, H. R., "Radiation Filter", IBM Tech. Disc. Bull., vol. 13, 8-1970, p. 755.

*Primary Examiner*—William H. Punter
*Attorney, Agent, or Firm*—Birgit E. Morris; Donald S. Cohen; Joseph D. Lazar

[57] ABSTRACT

Optical monitoring of the lateral dimensions of a pattern disposed on a substrate in the form of a wafer or mask is accomplished by testing for the lateral dimensions of a diffraction grating test pattern disposed adjacent the pattern. A beam of monochromatic light such as from a laser is diffracted by the test pattern and detectors determine the intensity of the diffracted beams. The detectors are disposed in a plane orthogonal to the plane of the test pattern and to the direction of the grating lines. The detectors are selectively spaced from each other according to the periodicity d of the grating and the width of the grating lines a is determined from a relationship of the detected intensities of the beams.

15 Claims, 12 Drawing Figures

OPTICAL LINE WIDTH MEASURING APPARATUS AND METHOD

This invention relates to optically testing the lateral dimensions of a diffraction pattern of material disposed on a substrate.

In copending U.S. application Ser. No. 862,190, filed Dec. 12, 1977 now U.S. Pat. No. 4,200,396, issued Apr. 29, 1980, entitled "Optically Testing the Lateral Dimensions of a Pattern," based on the invention of H. P. Kleinknecht and W. A. Bosenberg, there is described apparatus and a method of using such apparatus for testing diffraction test patterns on integrated circuit photomasks and wafers to determine the lateral dimensions of the circuit structure by testing the width of lines forming the diffraction pattern on a portion of the substrate adjacent the circuit pattern serving as the test pattern. The advantage of testing line widths on a grating test pattern allows for rapid and accurate determination of the widths of fine-line structures. Prior to this optical technique of using diffraction gratings, the measurement of individual lines on circuits formed on substrates in the integrated circuit techniques was done using in general, if not exclusively, optical microscopes. The use of optical microscopes is time consuming and require an operator's judgment for determining line widths of the integrated circuits. Line widths having dimensions less than two micrometers (2 μm) are very difficult to determine accurately using manually-operated optical microscope techniques. In contrast, the test on a grating pattern according to the system described in the above-identified patent simply comprises the exposure of a pattern to a beam of a laser and measuring the intensities of two diffraction orders. This measurement can be done in the transmission mode for masks, and in the reflection mode for wafers. The line widths for such patterns can be determined with an accuracy of ±5% for lines as narrow at 0.6 μm. The evaluation of the intensity measurements of the diffraction order beams is determined by the following formula.

$$a = \frac{d}{\pi} \cos^{-1} \sqrt{\frac{I_2}{I_1}} \quad (1)$$

where a is the line width of the lines comprising the diffraction grating, d is the grating period, $I_2$ is the intensity of the second diffraction order, and $I_1$ is the intensity of the first diffraction order.

According to the present invention, the detectors for determining the intensity of the diffracted beams are moveably positioned in a plane that is orthogonal to the diffraction grating strips being tested.

In the drawing

FIG. 3a is a diagram of a portion of the apparatus shown in FIG. 2a;

FIG. 3b is a schematic illustrating the geometric relationship of the apparatus shown in FIG. 3a;

FIG. 7 is a schematic of the electronics 20 of FIG. 2a.

Figure 1A:
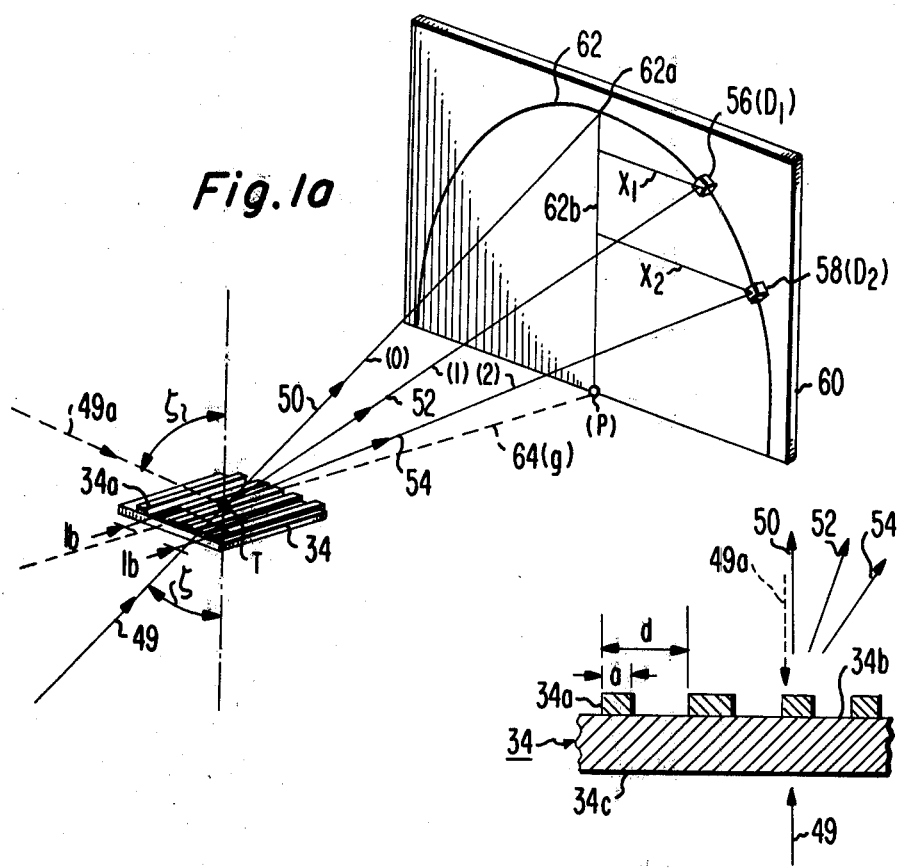
FIG. 1a is a schematic which illustrates the diffraction of a monochromatic beam passing through or reflecting from a diffraction grating pattern to a pair of detectors disposed on a surface perpendicular both to the plane of the test pattern and to the grating lines according to the invention.
Figure 1B:
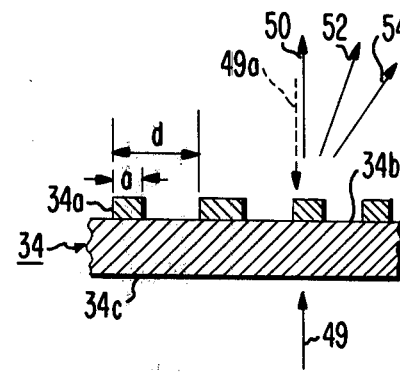
FIG. 1b is a fragmentary sectional view of the test pattern 34 of FIG. 1a taken along the viewing lines 1b—1b.

The diagram of FIG. 1 shows a diffraction test pattern 34 formed of a plurality of strips 34a. The diffraction grating 34 as best seen in FIG. 1b is formed by etching a layer of material on the surface 34b of a substrate 34c. Each strip 34a has a width a and a periodicity of d. The manner in which such a grating is formed is described in the aforementioned patent application.

Typically the test pattern 34 has a shape of a square with dimensions in the order of 0.2 to 0.5 mm on a side. The grating period, d, should be such that the ratio a/d approximately equals 0.25 or 0.75. It is noted from equation (1) that for these ratios a small change in the ratio of a/d results in the largest changes of the ratio $I_2/I_1$. Hence, the ratios of a/d∼0.25 or a/d∼0.75 provides the highest sensitivity. The reliability of this laser technique using diffraction grating test patterns is improved by avoiding internal reflections in the test sample. For this purpose Brewster's angle incidence is used as indicated in FIG. 1 with an angle such that:

$$\tan \zeta = n \quad (2)$$

where ζ is the incidence angle, n is the refractive index of the material of the substrate 34c, and wherein the polarization of the laser beam 49 is in the plane of the incidence, as shown in FIG. 1a.

A laser beam 49a is used for generating reflected diffraction beams 50, 52, 54 representing the zero order, the first order and the second order diffraction beams, respectively, when the grating is on a wafer with an opaque or non-transparent substrate 34c. If the test pattern (34) is on a mask wherein the substrate is a transparent material such as glass, the laser beam 49 is passed from under and to the test pattern to generate the diffraction beams. The diffracted beams 52 and 54 representing the first and second order beams are preferably used in the practice of the present invention although it is to be understood that higher order diffraction beams may be used, if desired.

According to the present invention, the first and second order beams 52 and 54 are detected by detectors 56 and 58, suitably photodiodes, positioned in a plane 60 that is normal or perpendicular to the extension of a plane defining the diffraction grating test pattern 34 and more particularly, normal to the grating lines 34a. The detectors 56 and 58 are moveably positioned so that the spacing between them along circular arc 62 is predetermined according to the diffraction grating periodicity d as will be explained. Furthermore, in order to properly position the detectors along the arcuate path 62, point P is used as a reference in the plane 60. Point P is determined by line 64(g) extending from one of the lines in the diffraction pattern 34 in the direction of the grating lines 34a and intersecting the plane 60. It will be noticed that the zero order diffraction beam 50 intercepts the plane 60 along the arcuate curve 62 in a position perpendicular to line 50 at point 62a. The manner in which the detectors are positioned relative to the test pattern 34 will be described in detail hereinafter.

Figure 2:
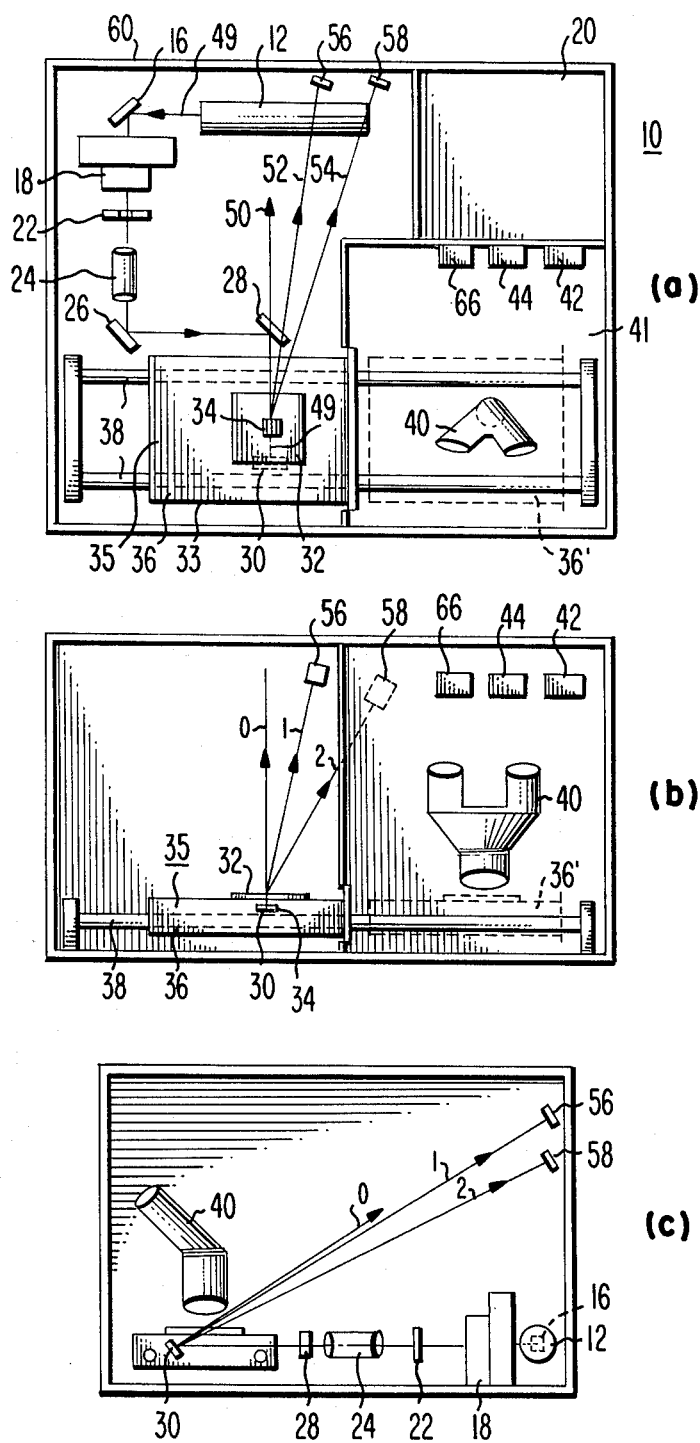
FIGS. 2a, 2b and 2c are schematics of the plan, front elevational and side elevational views, respectively, of apparatus according to one embodiment of the invention.

In FIGS. 2a, 2b and 2c, there is shown a preferred embodiment of the general arrangement and organization of the apparatus of the invention. The particular test set described here works in the transmission mode for the testing of masks. The test set or apparatus 10 includes a polarized laser 12, preferably a He-Ne laser (having thus a wavelength of 0.6238 μm), which generates a monochromatic light beam 49 that is reflected by a mirror 16 and passed through a chopper 18. Preferably, chopper 18 chops the light beam in a known manner at about 1000 Hz. The chopper 18 reduces background noise when a lock-in amplifier 48 (included in the electronics 20 (FIG. 7) to be described) is tuned to pick only the a.c. signal generated by the chopped light beam. The reference voltage generated by the chopper 18 is coupled to the lock-in amplifier 48.

Figure 7:
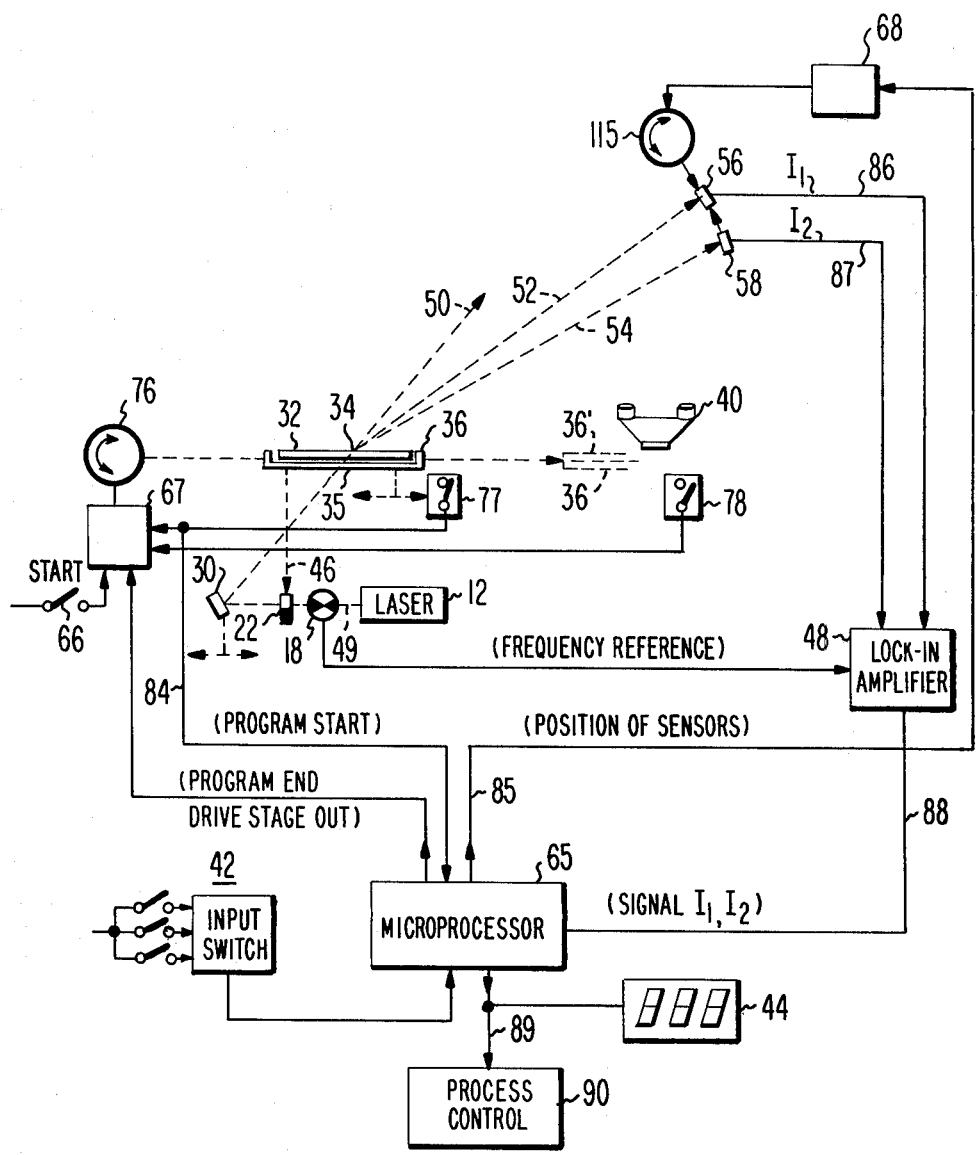

Electronics 20 includes the controls for operating the motors, and amplifiers for amplifying the various signals and for processing the signals of the detectors 56 and 58 as well as a computer for determining the strip width a and, if desired, comparing the strip width a with a predetermined value to provide an indication of the error in the desired strip width relative to a desired reference. The electronics 20 for providing these functions are arranged in a suitable manner known in the art. FIG. 7 is a schematic of a typical arrangement of the electronics useful in the practice of the invention, as will be described further hereinafter.

The chopped light passes through a suitably activated shutter 22, a beam collimator 24 for collimating the laser beam to compensate for any divergence of the beam. The beam is thereafter reflected from mirrors 26, 28 and 30, respectively, to pass through the test pattern 34. The beam 49 is passed through the pattern 34 preferably at Brewster's angle incidence described above. The beam 49 passing through the grating pattern results in a zero order beam 50, a first order beam 52, a second order beam 54 and possibly higher orders of refracted beams, not shown.

The first and second order beams 52 and 54, are intersected, respectively, by the photodiodes 56 and 58 positioned in a plane 60 which is perpendicular to the extension of the grating lines 34a of the test pattern 34.

It should be noted for the present, but as will be described further hereinafter, the detectors 56 and 58 are located on a common circular arc 62 of a right circular cone, the vertex, point T (FIG. 1a) of the cone lying in a plane of the diffraction grating 34 and the axis of revolution (T-P) of the cone lying along the grating strips 34a.

The photodiode detectors 56 and 58 are suitably connected to the lock-in amplifer 48 of electronics 20 (FIG. 7). Intensities $I_1$ and $I_2$ of the respective detectors are measured and processed according to equation (1) to determine the line width a by a microprocessor 65 (FIG. 7), to be described.

In order to properly position the test pattern on the mask 32 within beam 49, a mask holder 33 is provided with suitable mechanism (not shown) that can be moved with a conventional x-y manipulator on a stage 35. The stage assemby 35 as a whole, is moved on guide rods 38 between two extreme positions. One position (36) is at the left as seen in FIG. 2a represented by solid lines to position the pattern 34 to intersect the laser beam 49. The other position indicated for convenience as 36' hereinafter is at the right and indicated by dotted lines. In this position (36') the mask 32 is positioned under a microscope 40, the microscope being suitable provided with a cross-hair ocular to manually orient or position the mask 32 with respect to the optical axis of the microscope. The geometry of the two stage positions 36 and 36' is such that an operator can initially slide the stage to the right-hand position 36' (orientation position) and adjust the x-y manipulator of the mask holder 33 such that the test pattern is centered in the cross-hair of the microscope 40, and the grating lines 34a are aligned to be perpendicular to the surface 60 which contains the detectors 56 and 58. Thereafter, the stage 35 is moved to the left-hand position 36 (measurement position) and the test pattern 34 is automatically positioned to be correctly in line with the laser beam 49. The manner in which this correct positioning is achieved will be described further hereinafter.

In brief, the stage (35) movement from position 36' to position 36 is automatically moved by a motor 76 (shown in FIGS. 3a and 7) in response to initiation switch 66 and motor drive circuit 67 (FIG. 7). When the stage is moved to the left-hand position 36, a switch 77 is activated which starts the measurement process to determine the line width a. Furthermore, in the left-hand position 36, the stage 35 is preferably completely sealed in a light tight box or compartment formed by a cover, not shown, over the left-hand portion of the apparatus shown in FIGS. 2a and 2b. Thus, with such an arrangement, the apparatus is completely enclosed except for the portion including the microscope 40. Furthermore, when the stage 35 is in this position, means are provided to actuate a suitable lever 46 (FIG. 7) which opens the shutter 22 for the laser beam 49. It should be understood that the mechanical interlock means that are provided by this arrangement serves to meet the most rigid requirements of Radiological Health of the type, for example, that are set forth by the U.S. Department of Health, Education and Welfare.

A more detailed description of several of the components of the apparatus will now be described. As will be appreciated, for reasons of accuracy and stability, the stage 35 carrying the x-y manipulator (not shown) and the mask holder 33 is rather heavy. It is not possible thus to move the stage 35 from one position to the other by hand or even with a uniform motor drive without banging and shocking the delicate system at the two end positions (36 and 36') shown in FIG. 2a. It is clear that there is a need for a large moving force with slow speed motion movement at the start of the stage movement from either end position and furthermore, with a relatively high speed of stage motion between the end positions and a relatively slow speed motion at the end of the movements. Furthermore, there is a need for accurate positioning of the stage 35 at the two end positions. All of these requirements can, in principle, be accomplished by a so-called "sine-motion" mechanism of known form. Such sine-motion mechanisms, however, typically utilize a pin or a similar element sliding in a slot or along the edge of a guide rail or the like supporting the mechanism, such as stage 35, to be driven for accurate positioning. Such mechanisms also require very good mechanical tolerances and very smooth surfaces. Furthermore, very costly and bulky spring-loaded mechanisms are needed to eliminate any play in the movement of the stage.

Figure 3A:
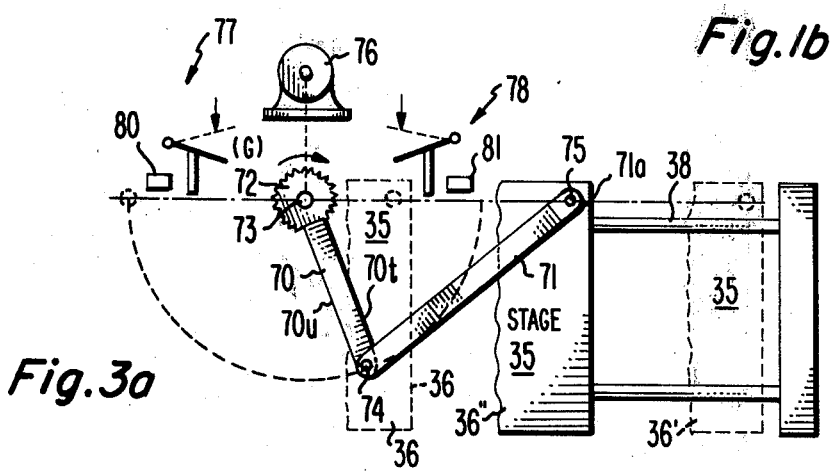

According to one aspect of the present invention, a sine-motion mechanism is provided comprising two lever arms (70 and 71, FIGS. 3a and 3b) which move on conventional rotational bearings, for example, ball bearings. With this structure a uniform positional reproducibility of better than 10 μm can be achieved with no special effort. The first lever arm 70 is fixed, as shown in FIG. 3a, to a gear 72 which, in turn, is rotatable via motor 76 about a ball bearing 73 which is suitably positioned about a shaft, not shown, connected to the housing or base plate of the stage 35. The other end of lever arm 70 is connected to the second lever arm 71 by means of a similar ball bearing 74. The other end 71a of lever arm 71 is mounted to the base plate of stage 36 via a ball bearing 75. End 71a of lever 71 is thus arranged to be moved horizontally along one of the guide rods 38. Gear 72 is driven by motor 76 under control of the electronics 20 (FIG. 7).

In FIG. 3a, the two extreme end positions 36 and 36' of the stage 35 are indicated by the dotted lines while an intermediate position 36'' is shown in solid lines. At the two end positions the arm 70 activates either end switch 77 and/or end switch 78. Thus, in stage position 36' arms 70 and 71 are extended end-to-end in tandem whereby the edge 70t of arm 70 will engage and thereby operate switch 78 from the position shown in dotted line. In the dotted line position 36, switch 78 suitably connected in the circuit of FIG. 7 to be described will cause the motor 76 in an operating mode to stop.

In stage position 36 arrived at by motor 76 rotating in the opposite direction will cause the arms 70 and 71 to overlap whereby the edge 70u of arm 70 will engage and operate switch 77 from the position shown in dotted line to the position shown in solid line. In the dotted line position switch 77 connected in the circuit of FIG. 7 will also stop the motor 76 in an operating mode from operating. Mechanical stops 80 and 81 serve to limit the mechanical movement of the arm 70 to define thereby a precise location of the stage in the extreme positions. Switches 77 and 78 are suitable single-pole double-throw switches. The switches are suitably connected to the electronics 67 and 65 (FIG. 7) to energize the circuit to perform the functions as will be further described.

Figure 3B:
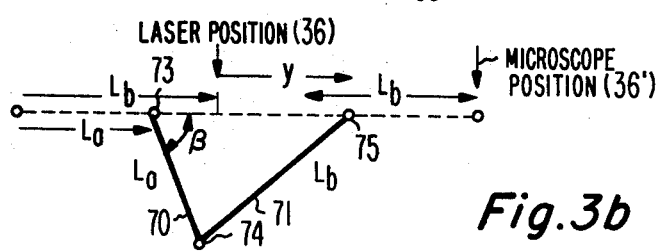
Figure 4:
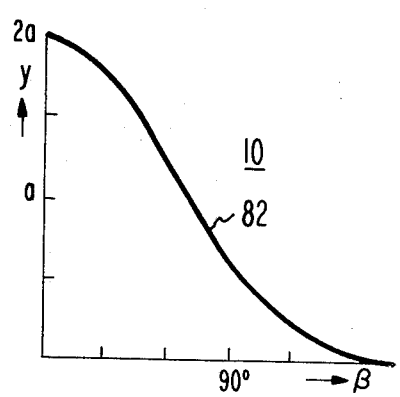
FIG. 4 is a curve plot of the angular relationship of angle β to the dimension of position y of the stage as illustrated in FIG. 3b.

Reference is made to FIG. 3b which illustrates the geometrical relationships of the lever arms 70 and 71 and the pivotal bearing points 74, 73 and 75. The lengths of the respective arms are represented by La and Lb, respectively. The angular position of lever 70 is represented by the angle $\beta$ and the position of the stage by the coordinate y. The angle $\beta$ varies from 0° to 180° as the stage 35 is moved from the microscope stage position 36' at which y=2(La) to the position over the laser beam 49 wherein y=0. Elementary geometry shows that the stage position 36 is a function of the angle $\beta$. This relationship is plotted as the curve 82 in terms of y vs. $\beta$ in FIG. 4 for the length ratio (Lb/La)=1.5:1 of the two lever arms 70 and 71, which is the practical value used in this design. Using a constant speed motor drive to cause a uniform rate of increase of the angle $\beta$ starting from $\beta=0$ (the microscope position 36'), the dimension y decreases initially very slowly and then gradually increases in speed during the middle portion of the movement and finally reduces speed as the angle $\beta$ approaches the value 180°, corresponding to the laser position 36 of the stage.

Furthermore, the end positions of the levers for stage positions 36' and 36 are very accurately fixed even if the motion of the stage (35) stops at angles of $\beta$ which are slightly different from 0° and 180°, respectively. One can calculate, using the geometric relationship indicated in FIG. 3b and the dimensions of the lever arms 70 and 71 stated above, that an inaccuracy of the end stop 80 of as much as 1 mm results in position inaccuracies in the microscope stage position 36' of only 17 μm and for the laser position 36 of the stage 35 of only 3 μm. (The asymmetry of these numbers can be traced to the asymmetry of curve 82.)

The manner in which the laser beam 49 traverses the photomask 32 will now be explained. As shown in FIGS. 1a and 2c, the laser beam 49 traverses the photomask 32 coming from underneath the mask at an acute angle $\zeta$, the Brewster's angle mentioned above, which angle, for glass with a typical refractive index of 1.5, is 56°.

Figure 5A:
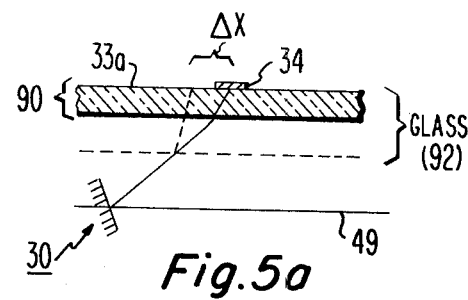
FIGS. 5a and 5b are schematics illustrating the angular relationship of one of the mirrors shown in FIG. 2c to the diffraction grating test pattern as shown in FIG. 1.
Figure 5B:
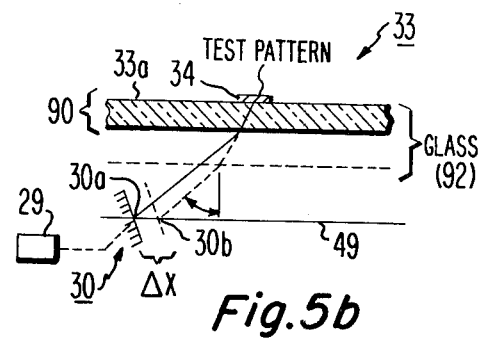

Reference is made to FIGS. 5a and 5b illustrating the refraction effect of the beam passing through a glass plate 90 of smaller thickness and through a glass plate 92 of larger thickness (dashed line). In practice, using the test set of the invention for determining line width, one has to be able to accommodate different glass plate thicknesses which vary for different mask types by as much as 0.75 mm. The mask holder 33 which holds such glass plates can be designed such that the top surface 33a with the test pattern 34 is always at the same height. In practice, the thickness of the pattern 34 itself is small (1 μm) as compared to the glass plate thickness. However, for different glass thickness the laser beam is shifted slightly, as indicated in FIG. 5a. This shift for a refractive index of n=1.5 and a thickness different of 0.75 mm is $\Delta x=0.625$ mm. This laser beam shift has to be compensated for or cancelled by a corresponding shift of mirror 30 as from position 30a to position 30b as shown in FIG. 5b. The mirror is suitably shifted by mounting it on a small stage 29 which is shifted by means of a calibrated micrometer with a suitable indicator. Thus, with the thickness and the refractive index of the glasses 90 and 92 being known, one can determine the proper position of the mirror 30 to effect the proper reflection of the laser beam 49 to pass through the test pattern 34. The Brewster's angle incidence $\zeta$ obviates or eliminates undesirable internal reflections of the laser beam passing through the glass plates, as mentioned before.

By the photo detectors 56 and 58 being positioned in a plane 60 that is perpendicular to the plane of the mask 32 and to the grating lines of the diffraction grating test pattern 34, two significant advantages are provided. First, one can utilize a relatively simple mechanism which assures that by merely setting a dial or some other suitable indicator (e.g., switch 42) to the known and correct grating constant d, the detectors 56 and 58 will be positioned precisely in the correct positions to intercept the first and second order diffracted beams 52 and 54. Second, the arrangement makes it possible to orient the photodiodes 56 and 58 such that normal incidence of the diffracted beams on the photo detectors is provided for both the first and second order beams for all grating constants.

The reason for these advantages comes from the fact that all diffracted beams form one-half of a circular cone, as described hereinabove, (FIGS. 1a and 1b). This phenomenon has been confirmed experimentally and can be explained by conventional interference principles. It should be understood, that all diffraction orders will intersect the vertical plane 60 along a circle, the radius 62b of which being fixed for a fixed incidence angle' $\zeta$. It is for this reason that the photodiodes 56 and 58 are mounted on the lever arms 100 and 102 that are rotatable around the axis T-P (FIG. 1a), the diodes being oriented on these arms such that they face the point T on test pattern 34. This arrangement results in a normal incidence $\zeta$ of all the diffracted beams on the detectors 56 and 58, for example, and any other detectors that may be used.

Before describing the structural implementation of the lever arms shown in FIG. 6, another aspect of the principles of the present invention will be described. The horizontal distances $x_1$ and $x_2$ shown in FIG. 1a representing the distance of the first and second order refracted beams 52 and 54 intersecting the plane 60 with respect to the middle line 62b is given by the following relationships:

$$x_1 = \frac{g \cdot \lambda}{\sin \zeta \cdot d} \quad (3)$$

$$x_2 = 2 \frac{g \cdot \lambda}{\sin \zeta \cdot d} \quad (4)$$

where g (represented by dashed line 64(g) in FIG. 1a) is the distance between the grating 34 and the screen 60, namely the distance T-P, and $\lambda$ is the wavelength of the laser, which in the present embodiment, is 0.6328 $\mu$m.

According to the parameters of the present embodiment the distance of $x_2$ is twice that of $x_1$. Furthermore, both the distances $x_1$ and $x_2$ vary in the same way with the grating constant d. In other words, if the grating constant selected for testing is to be changed, as will be described further, the distances $x_1$ and $x_2$ will change accordingly by the mechanism of FIG. 6.

In the embodiment being described, the incident laser beam 49 is passed through the test pattern 34 as shown by the solid line in FIG. 1a. This arrangement is used for the measurement of the line width (a) of transparent samples such as photomasks, in the so-called transmission mode of refraction. However, as indicated above, the same principles for determining line width can be used in the reflection mode of refraction for non-transparent samples of wafers. For such an arrangement the incident beam 49a is reflected on the wafer surface 34 at angle $\zeta$ as shown in FIG. 1a. The positioning of the mirrors 16, 26, 28 and 30, of course, will have to be rearranged in order to test for the line width of wafers in the reflection mode. In practice, therefore, a separate test apparatus would be more practical for the testing of wafers and photomasks rather than providing a universal test apparatus that can test both wafers and masks.

Figure 6:
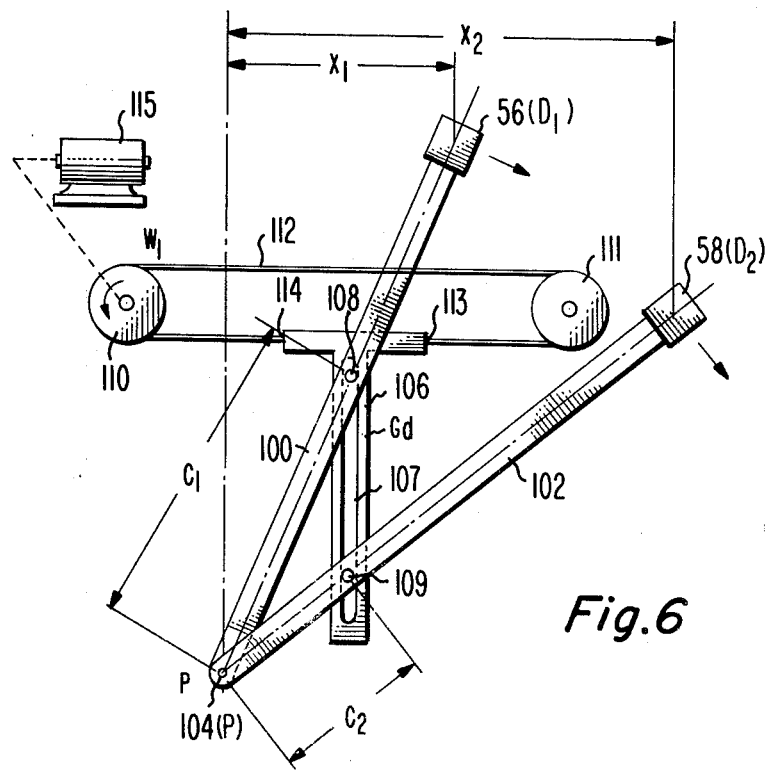
FIG. 6 is a schematic of the apparatus for moveably positioning the detectors of the diffracted beam intensities.

Referring now to FIG. 6, the lever mechanism shown for positioning the detectors will now be described. Lever arms 100 and 102 are attached to a bearing 104(P) which is suitably connected to the housing structure of panel 60 at point P as shown in FIG. 1A. Guide 106 is provided with a slot 107 for guiding pins 108 and 109 attached to the levers 100 and 102, respectively. Guide 106 is moved horizontally by means of a pulley system comprising wheels 110 and 111 carrying a guide wire 112 attached to the respective ends 113 and 114 of guide 106. Pulley 110 is driven by a motor 115 under control of the microprocessor 65 and the motor control 68 (FIG. 7).

Respective angular positions of the arms 102 and 100 are determined by the distances $c_1$ and $c_2$ of the pins 108 and 109 from point P located at bearing 104(P). The guide 106 is moved horizontally by the pulley system. The rotational setting or position of wheel 110 by motor 115 determines the position of the detectors 56 and 58 according to elementary geometry. Thus, if $c_1:c_2=2:1$, then $x_1:x_2=1:2$, are required by equations (3) and (4) described hereinabove. The rotational setting accordingly of wheel 110 can be calibrated in terms of grating constant d according to equations (3) and (4). It will be apparent that the precision of the mechanism of the lever arms and the pulleys does not have to be very high if the size of the active area of the photodiodes 56 and 58 is large enough. In a practical embodiment implementing the principles of the present invention, photodiodes having dimensions of a square of 10 mm along each edge were operated very satisfactorily to intercept the first and second order diffraction beams 52 and 54, respectively.

The operation of the test equipment 10 will be described by reference to the block schematic of the system illustrated in FIG. 7. Initially it is assumed that the stage 36 is in position 36' and the mask 32 to be tested is inserted into the mask holder 33 by the operator. Using a conventional x-y manipulator, the mask 32 is adjusted such that the center T (FIG. 1a) of the test pattern 34 coincides with a cross-hair in the ocular of the microscope 40.

In positioning the mask 32 carrying the test pattern 34, rotational adjustments can be made such that the pattern lines 34a are aligned with the y-direction of the microscope cross-hair. With the mask in proper orientation, start switch 66 located on the housing shown in FIGS. 2a and 2b is operated to energize motor 76 via a motor control circuit 67. Motor 76 drives the stage from position 36' to position 36 using the gear and lever mechanisms described above concerning FIG. 3a. At position 36 the end switch 77 is operated to stop further motion of motor 76. Switch 77 when operated, also initiates the program of microprocessor 65 via path 84. Microprocessor 65 reads the d-value from the input switch 42 located on the housing as shown in FIGS. 2a and 2b and provides a suitable command to detector drive electronics 68 via path 85 which controls stepping motor 115 which positions the photodetectors 56 and 58 according to the selected d-value as described above in conjunction with the description of FIG. 6.

In the meantime, with the stage in position 36 the shutter 22 is operated via a mechanical linkage 46 from the stage 36 to the shutter 22. With the shutter 22 open, laser 12 suitably in a continuous operation mode, provides the beam 49 through chopper 18 to mirror 30 to pass through the diffraction grating 34 (FIGS. 1a and 1b) to provide a diffracted set of beams 50, 52 and 54.

The output signals $I_1$ and $I_2$ from detectors 56 and 58 responding to the diffracted beams 52 and 54 are applied to a lock-in amplifier 48 via paths 86 and 87, respectively. The amplified output signals from amplifier 48 are coupled to microprocessor 65 via path 88. Microprocessor 65 combines these signals with the value d read from input switch 42 to calculate the value for the line width a using a suitable look-up table according to equation (1) or if desired using equation (1) directly. The resulting line width a is displayed on the display 44 located on the housing 10 as shown in FIGS. 2a and 2b.

Furthermore, if desired, the line width a can be transmitted to further processing controls 90 for use as desired via path 89.

What is claimed is:

1. In an apparatus for optically testing the lateral dimensions of a diffraction pattern of material disposed on a substrate, said diffraction pattern comprised of a planar array of spaced strips of material having a strip width a and a periodicity d, said apparatus including means for exposing said diffraction pattern to a beam of monochromatic light to diffract said beam into diffracted beams of various orders, detector means including detectors for measuring the intensity of at least two of the diffracted beams to obtain at least two intensity signals and means responsive to said intensity signals for determining the width a of said strips, wherein the improvement comprises:

means for moving said detectors to respective positions in a plane to intercept said diffracted beams, said intercept plane being orthogonal to said diffraction array strips;

wherein said detector moving means includes a pair of pivotal arms having a respective one of said detectors connected at one end of each arm, said arms being pivotally connected for rotation about an axis lying in an extension of and parallel to said diffraction array strips;

further including means to control the spacing between said detectors to a predetermined value corresponding to the periodicity d; and wherein said detector spacing means includes:

a pin on each of said pivotal arms;

a guide member including means for positioning said guide member in a direction parallel to the plane of said diffraction array strips and perpendicular to said pivotal arms axis; and a slot in said guide member extending orthogonally to the direction of movement of said guide member and adapted to receive each of said pins to effect pivotal movement of said arms as said guide member is moved, the distance between each pin and the pivotal axis of said arms and the position of said guide member defining thereby the respective positions of said detectors.

2. Apparatus according to claim 1 wherein said detectors are mounted on said arms at such an angle that their respective light sensitive faces are oriented normal towards said diffraction array.

3. Apparatus according to claim 1 wherein said detector moving means includes means for moving said detectors along a circular arc of a right circular cone, the vertex of said cone lying in the plane of said diffraction grating and the axis of revolution of said cone lying along the grating strips.

4. Apparatus according to claim 3 further including means for positioning said detectors such that the arcuate separation between said detectors is related to the periodicity d of said grating.

5. Apparatus according to claim 1, including a microscope and means for moveably supporting said diffraction pattern between two predetermined positions, one position to receive said beam of light and the other position for viewing said pattern with said microscope arranged with means to manually position and orient said diffraction pattern to a substantially correct position and orientation for receiving said beam of light and developing a pattern of diffracted beams.

6. Apparatus according to claim 5 further including rotating means attached to said apparatus and wherein said moveably supporting means includes sine-motion generator means comprising a pair of levers pivotally connected to each other at one of their respective ends, the other end of one of said levers being connected to said supporting means, the other end of the other lever arm being connected to said rotating means, so that, in response to rotation movement by said rotating means, said supporting means is moved in a sine-motion manner between said two predetermined positions.

7. In an apparatus for optically testing the lateral dimensions of a diffraction pattern of material disposed on a substrate, said diffraction pattern comprised of a planar array of spaced strips of material having a strip width a and a periodicity d, said apparatus including means for exposing said diffraction pattern to a beam of monochromatic light to diffract said beam into diffracted beams of various orders, detector means including detectors for measuring the intensity of at least two of the diffracted beams to obtain at least two intensity signals and means responsive to said intensity signals for determining the width a of said strips, wherein the improvement comprises:

means for moving said detectors to respective positions in a plane to intercept said diffracted beams, said intercept plane being orthogonal to said diffraction array strips;

wherein said diffraction pattern is supported on a transparent support made of material having a given index of refraction, further including mirror means for reflecting said beam of light through said support and said diffraction pattern, and calibrated means for positioning said mirror means to compensate for displacement errors of said beam due to said refractive index.

8. In a method for optically testing the lateral dimensions of a diffraction pattern of material disposed on a substrate, said diffraction pattern comprised of a planar array of spaced strips of material having a strip width a and periodicity d, said apparatus including means for exposing said diffraction pattern to a beam of monochromatic light to diffract said beam into diffracted beams of various orders, detector means including detectors for measuring the intensity of at least two of the diffracted beams to obtain at least two intensity signals and means responsive to said intensity signals for determining the width a of said strips, further comprising the steps of:

positioning said detectors to respective positions in a plane to intercept said diffracted beams, said intercept plane being orthogonal to said diffraction array strips;

reflecting by a positionable mirror said beam of light through a transparent support carrying said diffraction pattern;

said transparent support being made of material having a given index of refraction; and positioning said mirror to compensate for displacement errors of said beam due to said refractive index.

9. The method of claim 8 including the step of positioning a pair of pivotal arms, each arm having a respective one of said detectors connected thereto, said arms being pivotally connected to a shaft whose axis lies in an extension of and parallel to said diffraction array strips.

10. The method according to claim 9 further including the step of positioning said detectors at such an angle that their respective light sensitive faces are oriented normal towards said diffraction grating.

11. The method according to claim 9 further including the step of spacing detectors to a predetermined value corresponding to the periodicity d.

12. The method according to claim 8 including the step of moving said detectors along a circular arc of a right circular cone, the vertex of said cone lying in the plane of said diffraction grating and the axis of revolution of said cone lying along the grating strips.

13. The method according to claim 12 further including the step of positioning said detectors such that the arcuate separation between said detectors is related to the periodicity d of said grating.

14. The method according to claim 11 wherein said spacing step includes the step of positioning each of detectors on pivotal arms that are pivoted about an axis extending from and parallel to the plane of said diffraction array strips.

15. The method according to claim 8 further including the step of orienting at a first stage position, said pattern so that the diffraction pattern is in an orientation for developing diffraction beams.

* * * * *